United States Patent
Agcaoili et al.

(10) Patent No.: US 12,376,067 B2
(45) Date of Patent: Jul. 29, 2025

(54) AUTOMATIC TESTING OF EMERGENCY CALL LOCATION DETERMINATION

(71) Applicant: DISH Wireless L.L.C., Englewood, CO (US)

(72) Inventors: Arnold Agcaoili, Littleton, CO (US); Jeffrey McSchooler, Parker, CO (US)

(73) Assignee: DISH Wireless L.L.C., Englewood, CO (US)

( * ) Notice: Subject to any disclaimer, the term of this patent is extended or adjusted under 35 U.S.C. 154(b) by 0 days.

(21) Appl. No.: 18/529,661

(22) Filed: Dec. 5, 2023

(65) Prior Publication Data

US 2024/0114478 A1   Apr. 4, 2024

Related U.S. Application Data

(62) Division of application No. 17/379,721, filed on Jul. 19, 2021, now Pat. No. 11,877,255.

(51) Int. Cl.
| | |
|---|---|
| *H04W 4/00* | (2018.01) |
| *B64U 10/13* | (2023.01) |
| *G01S 19/17* | (2010.01) |
| *H04W 4/90* | (2018.01) |
| *H04W 64/00* | (2009.01) |
| *B64U 101/00* | (2023.01) |

(52) U.S. Cl.
CPC ............ *H04W 64/00* (2013.01); *B64U 10/13* (2023.01); *G01S 19/17* (2013.01); *H04W 4/90* (2018.02); *B64U 2101/00* (2023.01)

(58) Field of Classification Search
CPC ....... H04W 4/90; H04W 64/00; H04W 24/06; H04W 4/12; H04W 24/10; H04W 76/40
See application file for complete search history.

(56) References Cited

U.S. PATENT DOCUMENTS

| | | |
|---|---|---|
| 8,818,354 B1 | 8/2014 | Bennett |
| 10,791,221 B1* | 9/2020 | Vislocky .............. H04M 3/5116 |
| 2008/0254790 A1* | 10/2008 | Baldridge ............ H04M 3/5116 |
| | | 455/424 |
| 2019/0055015 A1 | 2/2019 | Allard et al. |
| 2019/0253861 A1 | 8/2019 | Horelik et al. |
| 2021/0211858 A1 | 7/2021 | Ellenbeck et al. |

* cited by examiner

*Primary Examiner* — Omoniyi Obayanju
(74) *Attorney, Agent, or Firm* — Kipman T. Werking; Frontier IP Law PLLC

(57) ABSTRACT

A facility for testing location determination for emergency calls is described. Software on a mobile device collects a GPS location from the mobile device, and places an emergency call that encloses information usable by the emergency call processing system to calculate mobile device location. After the system performs this calculation, the call is detected to be a testing call and routed to a computer rather than an emergency dispatcher. The computer sends an SMS or other non-telephony message to the mobile device containing the calculated location. The mobile device stores the collected GPS location and the calculated location received in the non-telephony message together for comparison.

15 Claims, 10 Drawing Sheets

FIG. 6 observation table 600

| time | cell site id | sector id | layer | protocol | location information | calculated location | GPS location | error distance | outside tolerance |
|------|-------------|-----------|-------|----------|---------------------|---------------------|--------------|----------------|-------------------|
| 8:57:02 | 193401 | 1 | 4 | GSM | xxx | 47.6219° N, 122.3527° W | 47.6225° N, 122.3520° W | 80m | yes |
| 8:57:04 | 193401 | 1 | 4 | GPRS | xxx | 47.6223° N, 122.3523° W | 47.6225° N, 122.3520° W | 30m | no |

AUTOMATIC TESTING OF EMERGENCY CALL LOCATION DETERMINATION

BACKGROUND

Telephony systems in many countries include an emergency calling feature for seeking the assistance of firefighters, police, ambulance crews, etc. In the US, a caller can dial 911 to be connected to a specialized call center—called a public safety access point—where such emergency services are dispatched.

For 911 calls from land lines, telephone utilities attach the service address for the land line to calls for use by dispatchers to direct emergency responders to the caller. For 911 calls from wireless phones, the wireless phone attaches certain information about its present location, which is transformed into a calculated location for use by dispatchers.

The Federal Communications Commission mandates testing the accuracy of the systems operated by wireless carriers to provide dispatchers calculated locations for 911 calls from wireless phones. FIG. 1 is a data flow diagram showing a conventional approach to testing the accuracy of a system operated by a wireless carrier to provide calculated locations to dispatchers for 911 calls from wireless phones. In the conventional approach, a specialized testing technician carries a wireless phone 110 to a testing location, such as one in a particular sector of a particular cell site. The testing technician manually places a 911 call 111 with the wireless phone. Functionality built into the wireless phone automatically attaches the following information to this manual 911 call: the phone number 112 of the phone; and location information 113 usable to calculate the phone's location, such as signal strength for each of multiple nearby wireless base stations. The call also carries voice data 115 encoding speech of the testing technician.

Call 111 is received by a wireless base station in the wireless carrier's radio access network 120. The radio access network forwards the call 121 to the wireless carrier's switch 130. The switch forwards the call 131 to a 911 aggregator node 140. The 911 aggregator node receives 911 calls from multiple wireless networks—and, in some cases, also landline networks—in order to route each to a public safety access point operated for the appropriate geographic region. In addition to doing this routing, the 911 aggregator transforms the location information 133 of the call into a calculated location for the phone. The aggregator forwards a version of the call 141 to which the calculated location 144 has been added to the public safety access point 150 operated for the geographic region containing the calculated location.

On receipt at the public safety access point, the call is routed to an available dispatcher. The caller identifies themselves as a 911 testing technician, and requests that the dispatcher relay via voice the calculated location passed to the public safety access point as part of the call. Typically expressed as a lat/lon, the version of the calculated location relayed by the dispatcher is a pair of 5-9 digit numbers. Voice data 152 for the dispatcher's side of the call 151, including the calculated location 151 spoken by the dispatcher, is routed back to the phone via the switch and radio access network. The technician writes the calculated location spoken by the dispatcher on a clipboard, together with date and time information, and a GPS location read by the technician from a dedicated GPS location-finding device. The clipboard is later reviewed to assess whether the calculated location is within tolerance of the GPS location and then this is repeated until all testing is completed.

BRIEF DESCRIPTION OF THE DRAWINGS

FIG. 6 is a table diagram showing sample contents of an observation table used by the facility in some embodiments to store testing observations.

DETAILED DESCRIPTION

Figure 1:
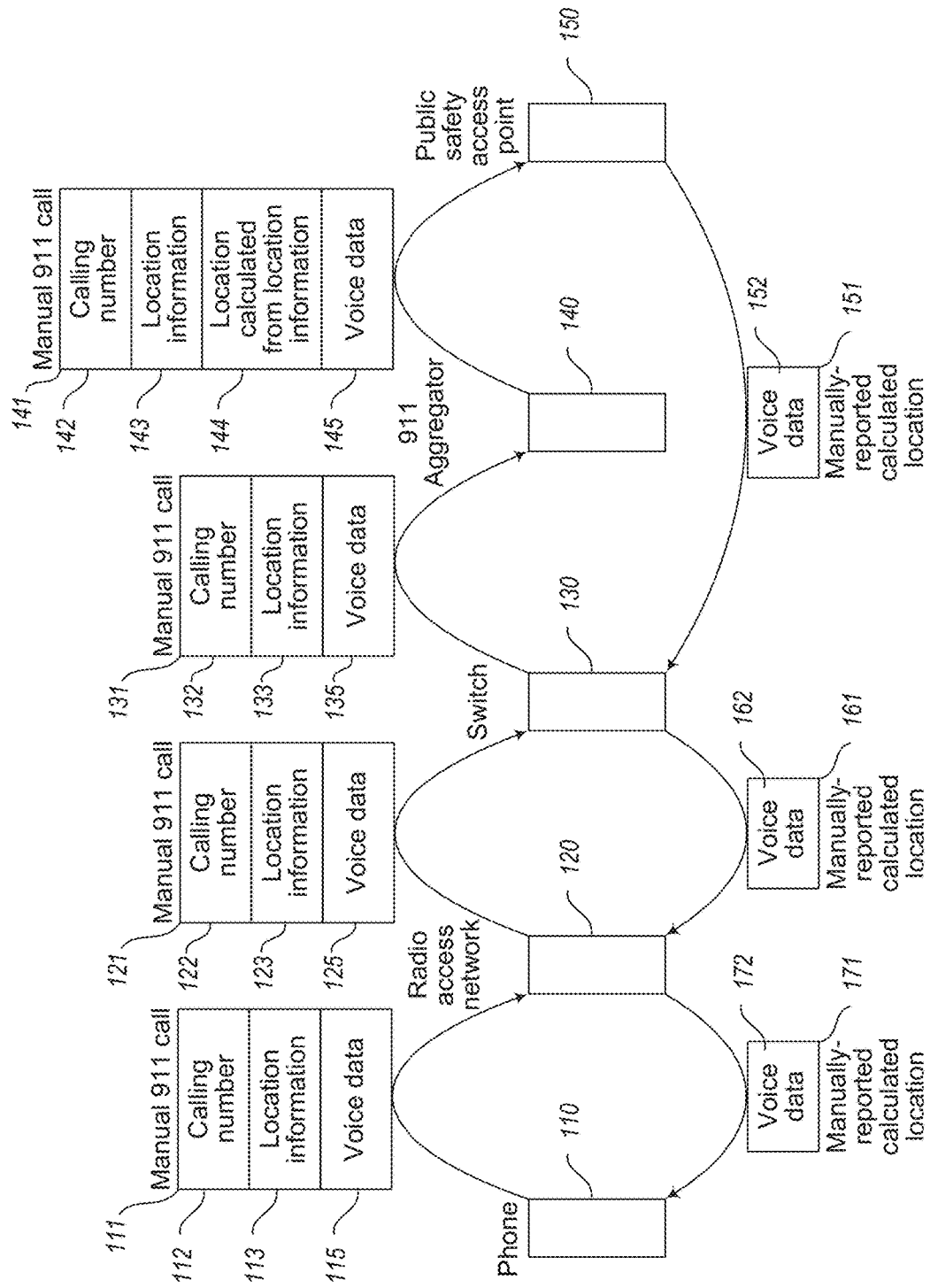
FIG. 1 is a data flow diagram showing a conventional approach to testing the accuracy of a system operated by a wireless carrier to provide calculated locations to dispatchers for 911 calls from wireless phones.

The inventors have recognized significant disadvantages of conventional approaches to testing the accuracy of systems operated by wireless carriers to provide to dispatchers calculated locations for 911 calls from wireless phones. First, the on-duty time of an emergency dispatcher is a public safety resource: every dispatcher participating in a testing call is unavailable to handle a substantive emergency call. Second, relaying calculated location information verbally from a dispatcher to a technician is subject to inaccuracy: digits can be omitted, transposed, misheard, etc. The technician's transcription of verbally-received calculated location information is similarly subject to inaccuracy. Third, testing technicians are specially-trained, and also rely on some level of experience working on this task. Thus, other workers typically can't be substituted to perform the task.

To overcome these disadvantages of conventional approaches to testing the accuracy of calculated locations for 911 calls from wireless phones, the inventors have conceived and reduced to practice a software and/or hardware facility for automatically testing emergency call location determination ("the facility").

The facility includes a special-purpose app installed on a smartphone or other wireless telephony device. In response to automatic or manual initiation, the app collects a GPS location of the smartphone contemporaneously with placing a 911 call. As with the conventional approach, the smartphone automatically attaches calling number and location information to the 911 call. At the 911 aggregator, the location information is transformed into a calculated location. The 911 aggregator also recognizes the calling number from a list of phone numbers assigned to testing phones, and routes the 911 call—with calculated location—to a public safety access point simulator ("simulator"), rather than to an actual public safety access point staffed by dispatchers. The simulator is an unattended computer that automatically receives testing 911 calls, extracts testing data from their headers, and sends the extracted information back to the calling smartphone via SMS. The app accesses this received SMS, extracts testing data from it, and stores it together with the collected GPS location in an observations table. Contents of the observations table are then available for further automatic processing, such as to certify compliance with accuracy standards, and/or identify cell sites where calculated locations are outside of tolerance—or otherwise unacceptable—for remediating service.

In some embodiments, the facility provides a way to use the testing phone to make a live 911 call, such as by (1) providing an explicit command for disability testing mode, and/or (2) tracking the last time the testing phone was used to perform testing, and timing out of testing mode after an inactivity period such as 5 minutes, 10 minutes, 15 minutes, 30 minutes, 1 hour, 2 hours, etc.

In some embodiments, the smartphone executing the testing app is borne to a sequence of testing locations by an aerial drone, or other miniature autonomous vehicle. In such embodiments, a person driving a small vehicle can launch and recover multiple drones that together do the work of a significant number of conventional testing technicians.

By performing in some or all of the ways discussed above, the facility greatly reduces the burdens of testing the accuracy of calculated locations for 911 calls, including completely obviating the participation of emergency dispatchers, reducing the need for specialized training and experience in the field, expediting the testing process, and improving the quality of the testing results, removing the ability to share incorrect verbal information, and the ability to analyze and act upon them.

Also, the facility improves the functioning of computer or other hardware, such as by reducing the dynamic display area, processing, storage, and/or data transmission resources needed to perform a certain task, thereby enabling the task to be permitted by less capable, capacious, and/or expensive hardware devices, and/or be performed with less latency, and/or preserving more of the conserved resources for use in performing other tasks or additional instances of the same task. For example, the facility significantly reduces the amount of voice data, and data overall, that must be transmitted in order to perform testing, allowing the operator of a wireless network using the facility to reduce its capacity overall, such as by using fewer components, or the same number of less powerful, less expensive components. Also, by bypassing the staffed public safety access point, the facility reduces the call-processing capacity needed there and the technician can test as many times as desired without feeling pressure to stop spending the time of 911 operators for non-emergency situations.

Figure 2:
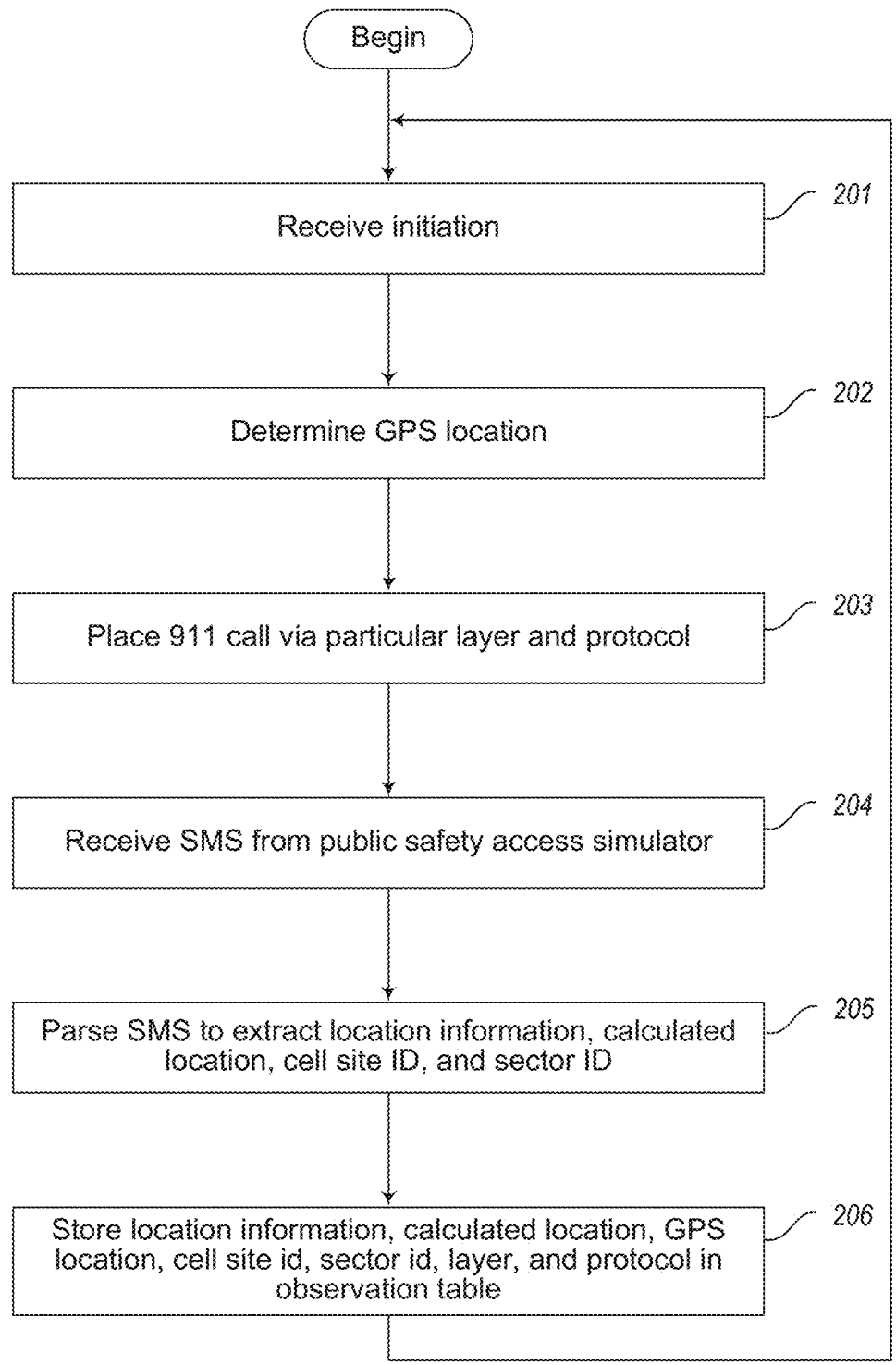
FIG. 2 is a flow diagram showing a process performed by the facility in some embodiments on a smartphone to conduct a testing iteration.

FIG. 2 is a flow diagram showing a process performed by the facility in some embodiments on a smartphone to conduct a testing iteration. In some embodiments, the facility performs this process in a specialized smartphone app. In act 201, the facility receives an initiation signal, such as from activation of an on-screen control or other user input, or an automatic initiation signal, such as one produced in response to arriving at a suitable testing location. In act 202, the facility determines the smartphone's present GPS location. In act 203, the facility places a 911 call, using a particular wireless network layer and protocol. The call placed by the facility in act 203 is portrayed in FIG. 3 discussed below.

Figure 3:
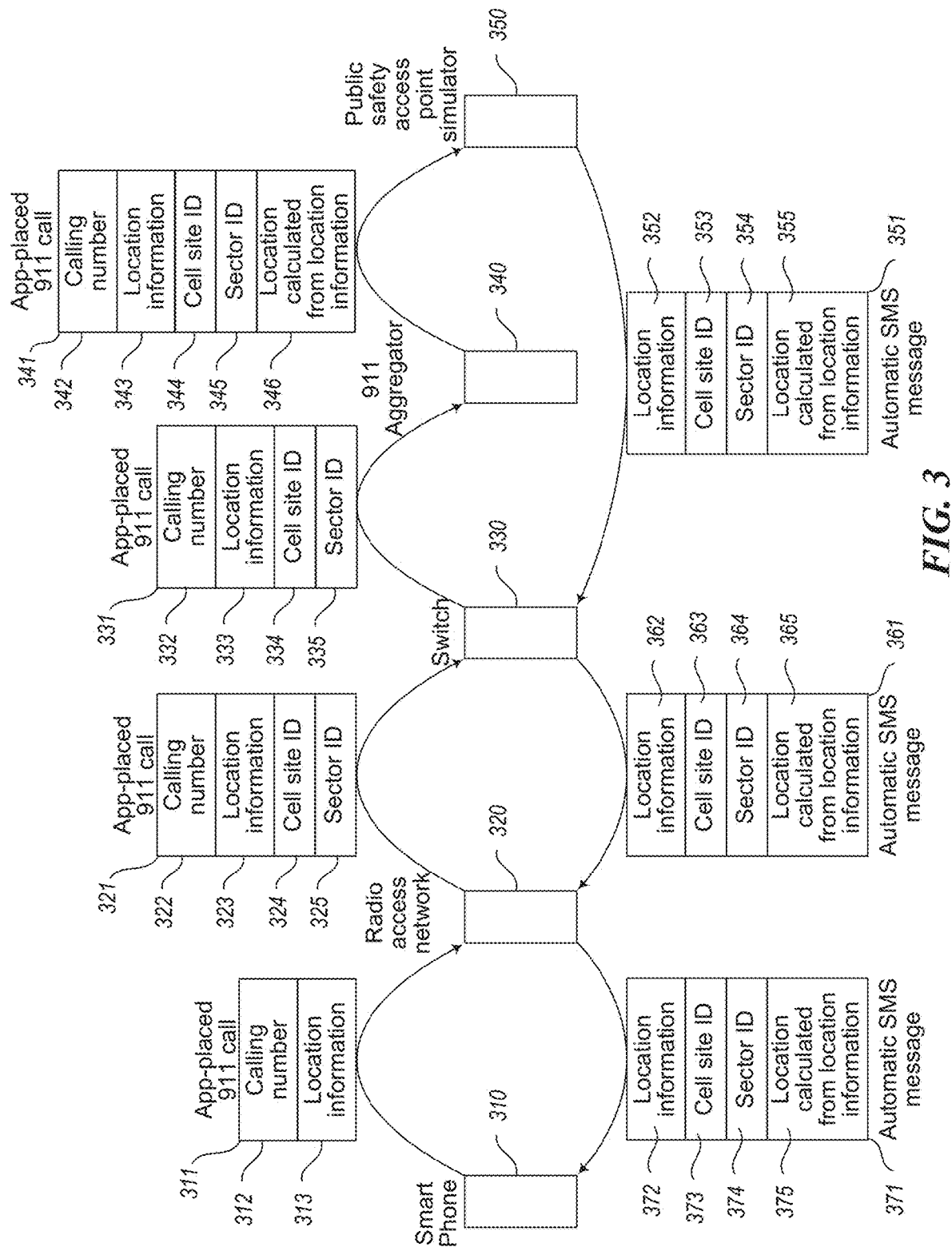
FIG. 3 is a data flow diagram showing the flow of data among nodes in a testing iteration.

FIG. 3 is a data flow diagram showing the flow of data among nodes in a testing iteration. The diagram shows the testing smartphone 310 transmitting an app-placed 911 call 311 to the wireless carrier's radio access network. The call includes the calling number 312 of the smartphone, as well as location information 313 from which the smartphone's location can be calculated. In some embodiments (not shown), the facility adds certain location information to the call at the radio access network base station through which the call passes, either in addition to or instead of information added by the smartphone. When the radio access network receives the call, it determines and attaches the cell site id 324 and sector id 325 where the call originated, and forwards it to the wireless carrier's switch 330 as call 321. The switch forwards the call 331 to a 911 aggregator. The 911 aggregator transforms the location information 333 into a calculated location 346, which it attaches to the call. In various embodiments (not shown), the facility performs the location calculation at various other nodes, such as in the switch or the radio access network. In various embodiments, the facility performs the location calculation using a variety of calculation techniques, including but not limited to those based on signal strength measured at the mobile station or base station, time of arrival of radio signals at the mobile station or base station, angle of arrival of radio signals at the mobile station or base station, or various combinations. The 911 aggregator further determines that the calling number 332 is a test call, and accordingly routes the updated call 341 to simulator 350, rather than to an actual public safety access point. This logic is shown in FIG. 4 and discussed below.

Figure 4:
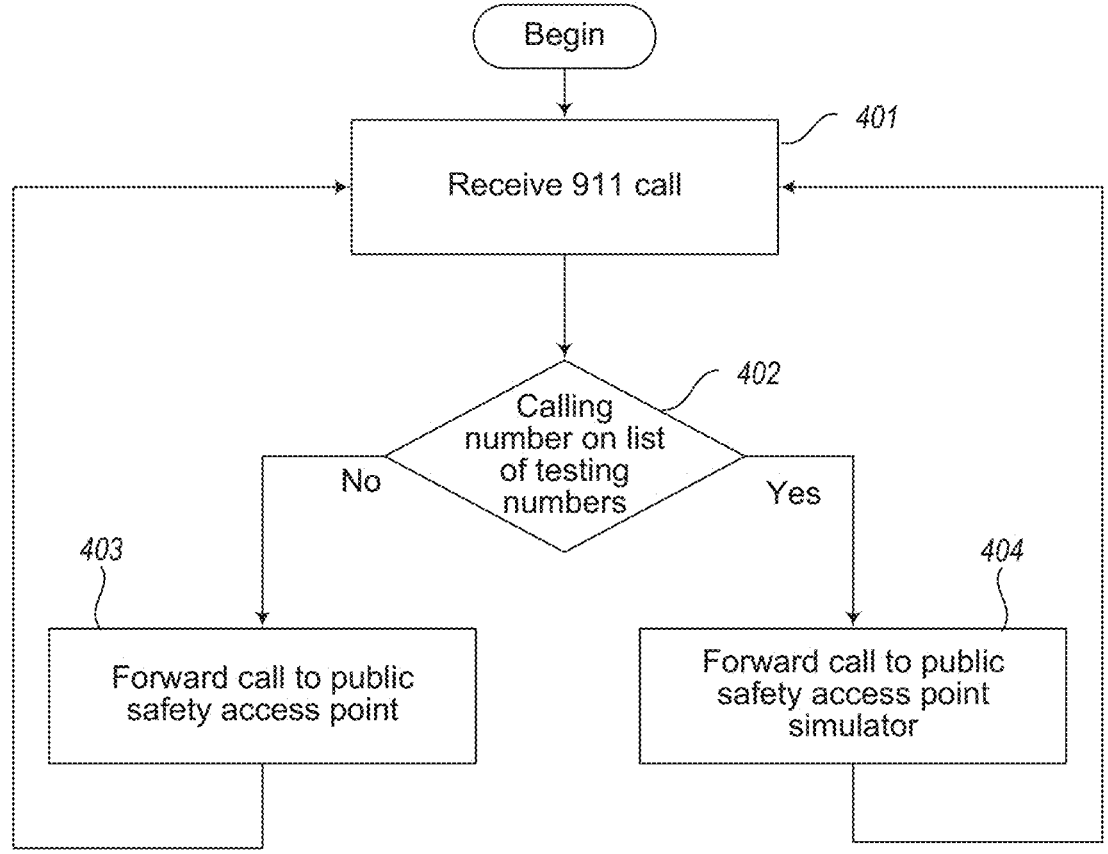
FIG. 4 is a flow diagram showing a process performed by the facility in some embodiments in the 911 aggregator to route actual and testing 911 calls to conduct a testing iteration.

FIG. 4 is a flow diagram showing a process performed by the facility in some embodiments in the 911 aggregator to route actual and testing 911 calls to conduct a testing iteration. In act 401, the faculty receives a 911 call. In act 402, if the calling number for the received call is on a list of testing numbers, then the facility continues in act 404, else the facility continues in act 403.

In various embodiments, the facility uses a variety of other approaches (not shown) to determining whether a 911 call is a testing call. For example, in some embodiments, the facility makes this determination based upon a special value in the call's header information. The same constant value can be included in the header of every testing call, or this value can be different among testing calls, such as a constant that is cryptographically signed with a public key of the phone, the phone number of the phone, etc. In some embodiments, the facility makes the determination of act 402 based upon the smartphone app placing a call to a destination phone number that is different from the standard emergency call destination phone number, e.g., 811 as contrasted with 911.

In act 403, where the call has been determined not to be a testing call, the facility forwards the call received in act 401 to an actual public safety access point, and continues in act 401 to receive the next call. In act 404, where the call has been determined to be a testing call, the facility forwards the call to a simulator. After act 404, the facility continues in act 401 to receive the next call.

Those skilled in the art will appreciate that the acts shown in FIG. 4 and in each of the flow diagrams discussed herein may be altered in a variety of ways. For example, the order of the acts may be rearranged; some acts may be performed in parallel; shown acts may be omitted, or other acts may be included; a shown act may be divided into subacts, or multiple shown acts may be combined into a single act, etc.

Figure 5:
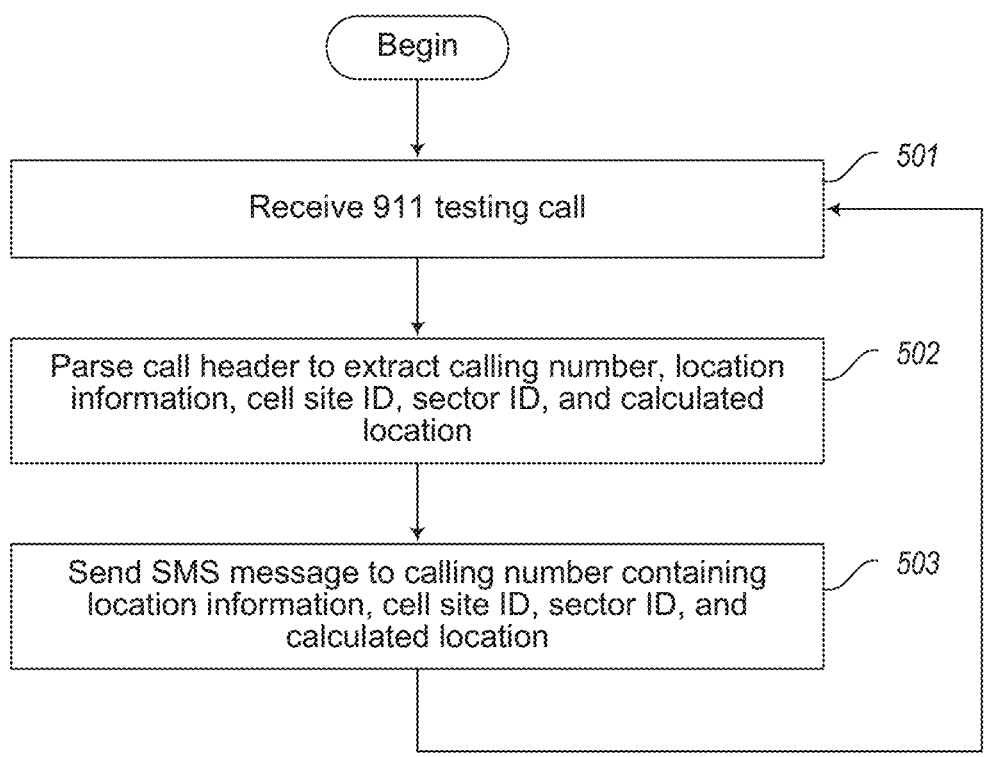
FIG. 5 is a flow diagram showing a process performed by the facility in some embodiments in the simulator to conduct a testing iteration.

FIG. 5 is a flow diagram showing a process performed by the facility in some embodiments in the simulator to conduct a testing iteration. In act 501, the facility receives 911 testing call 341 from the 911 aggregator. In 502, the facility parses the call header to extract the call's calling number, location information, cell site id, sector id, and calculated location. In act 503, the facility composes and transmits an SMS message to the calling number that contains the extracted location information, cell site id, sector id, and calculated location. In various embodiments (not shown), the facility includes additional, fewer, or different pieces of information in the SMS message. After act 503, the facility continues in act 501 to receive the next 911 testing call.

Returning to FIG. 3, the diagram shows the simulator sending automatic SMS message 351 to the switch. The SMS message contains location information 352, cell site id 353, sector id 354, and calculated location 355. The switch forwards SMS message to the radio access network as SMS message 361, which forwards the SMS message as SMS message 371 to the smartphone.

Returning to FIG. 2, in act 204, the facility receives the SMS message sent by the simulator. In act 205, the facility parses the SMS message received in act 204 to extract location information, calculated information, cell site id, and sector id. In act 206, the facility stores in an observation table the location information, calculated information, cell site id, and sector id extracted from the SMS message in act 205, as well as the GPS location determined in act 202, and the network layer protocol used in act 203 to place the automatic 911 call. In various embodiments (not shown), the facility includes additional, fewer, or different pieces of information the stored row of the observation table. After act 206, the facility continues in in act 201 to receive the next initiation.

FIG. 6 is a table diagram showing sample contents of an observation table used by the facility in some embodiments to store testing observations. In various embodiments, the observation table in which the facility stores the new testing observation is stored on a server to which the smartphone connects wirelessly, or is stored on the smartphone and periodically synchronized with a central table on the server. The observation table 600 is made up of rows, such as rows 601 and 602, each corresponding to a different testing observation. Each row is divided into the following columns containing information about that testing observation: a date column 611 indicating the date on which the test was performed; a time column 612 indicating the time at which the test was performed; a cell site id column 613 identifying the cell site at which the test was performed; a sector id column 614 indicating the sector of the indicated cell site where the test was performed; a layer column 615 indicating a network layer used to place the testing call; a protocol column 616 indicating a network protocol used to place the call; a location information column 617 containing information about the smartphone's location included in the testing call for use to determine a calculation location of the smartphone; a calculated location column 618 containing latitude and longitude of the location calculated for the smartphone on the basis of the location information; a GPS location column 619 containing latitude and longitude of the location reported by the smartphone's GPS subsystem, an error distance column 620 indicating the distance between the test's calculated location and its GPS location; and an outside tolerance column 621 indicating whether the error distance is within some tolerance threshold, such as 50 meters. For example, row 602 indicates that a test occurred at 8:47:04 AM on Sep. 2, 2021 in sector 1 of cell site 193401, using layer 4 and protocol GPRS. The row contains location information sent in this testing call, which resulted in the calculated location 47.6223° N, 122.3523° W. The smartphone determined a GPS location of 47.6225° N, 122.3520° W, yielding an error distance of 30 meters, which is not outside a tolerance of 50 meters.

While FIG. 6 shows a table whose contents and organization are designed to make them more comprehensible by a human reader, those skilled in the art will appreciate that actual data structures used by the facility to store this information may differ from the table shown, in that they, for example, may be organized in a different manner; may contain more or less information than shown; may be compressed, encrypted, differently encoded, and/or indexed; may contain a much larger number of rows than shown, etc.

Figure 7:
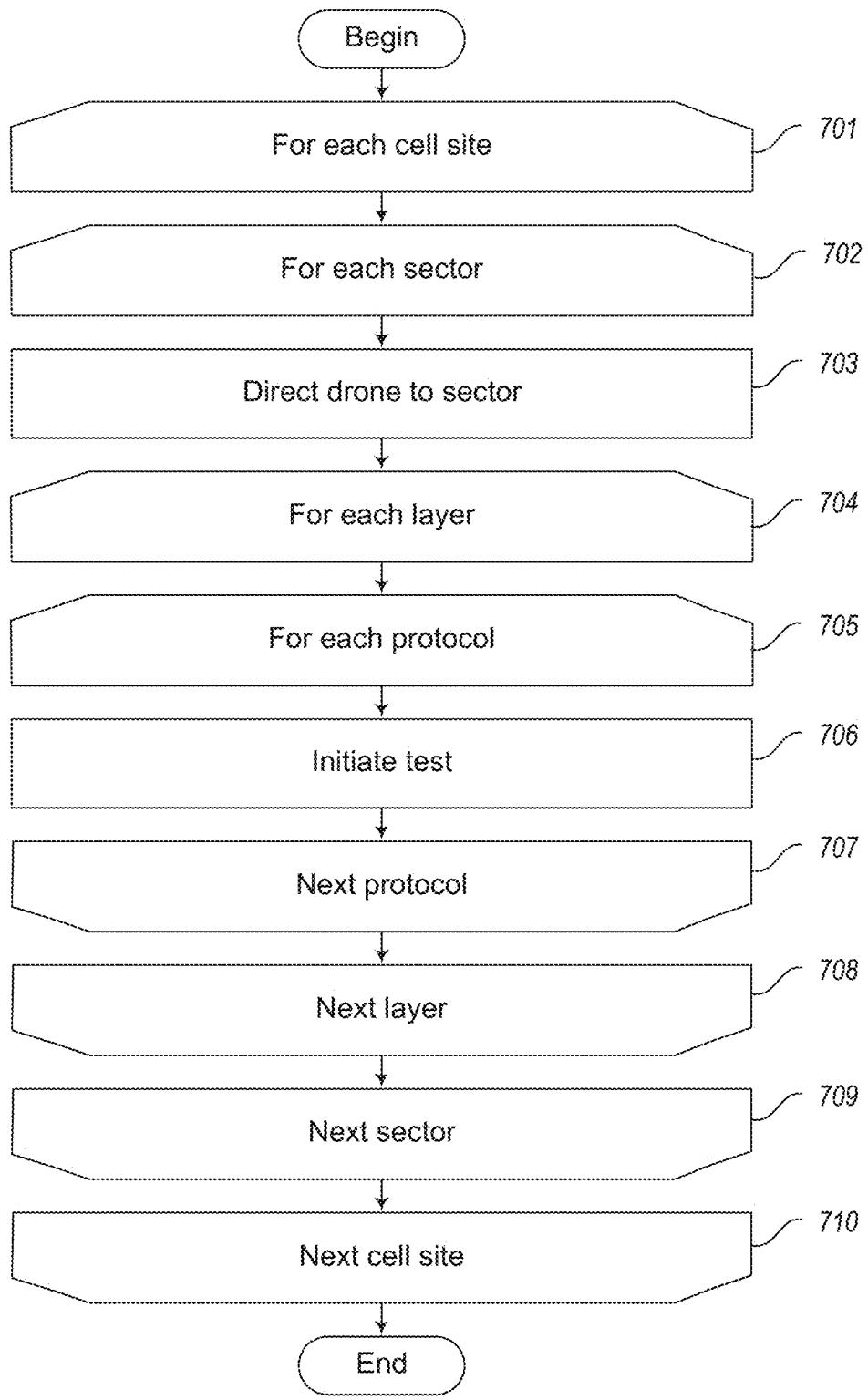
FIG. 7 is a flow diagram showing a process performed by the facility in some embodiments to perform testing using a smartphone borne by a drone.

In some embodiments, the facility uses a drone or other small autonomous vehicle to carry the testing smartphone into locations that should be tested, such as one or more locations in each sector of each cell site to be tested. FIG. 7 is a flow diagram showing a process performed by the facility in some embodiments to perform testing using a smartphone borne by a drone. In various embodiments, this process is performed in the testing smartphone; in another mobile device; in a desktop device; in a server; or in the drone or autonomous vehicle itself. In acts 701-710, the facility loops through each of multiple cell sites to be tested. In acts 702-709, the facility loops through each sector of the current cell site. In act 703, the facility directs the drone to the current sector of the current cell site. In acts 704-708, the facility loops through each network layer to be tested. In acts 705-707, the facility loops through each network protocol to be tested. In act 706, the facility initiates a test for the current cell site, sector, network layer, and network protocol. After act 710, these acts conclude.

Figure 8:
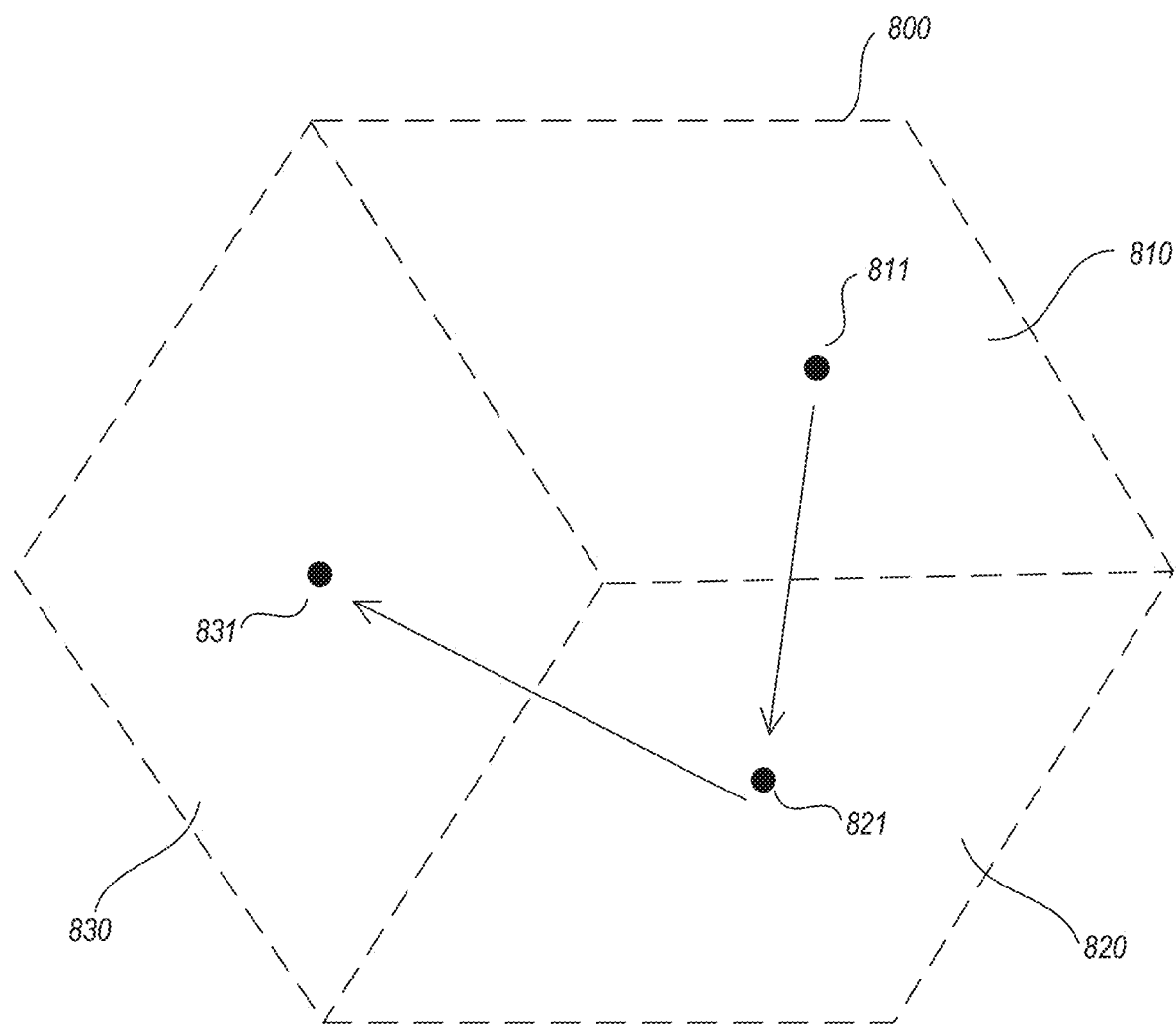
FIG. 8 is a map diagram showing a first drone route through a selected cell site to be tested.
Figure 9:
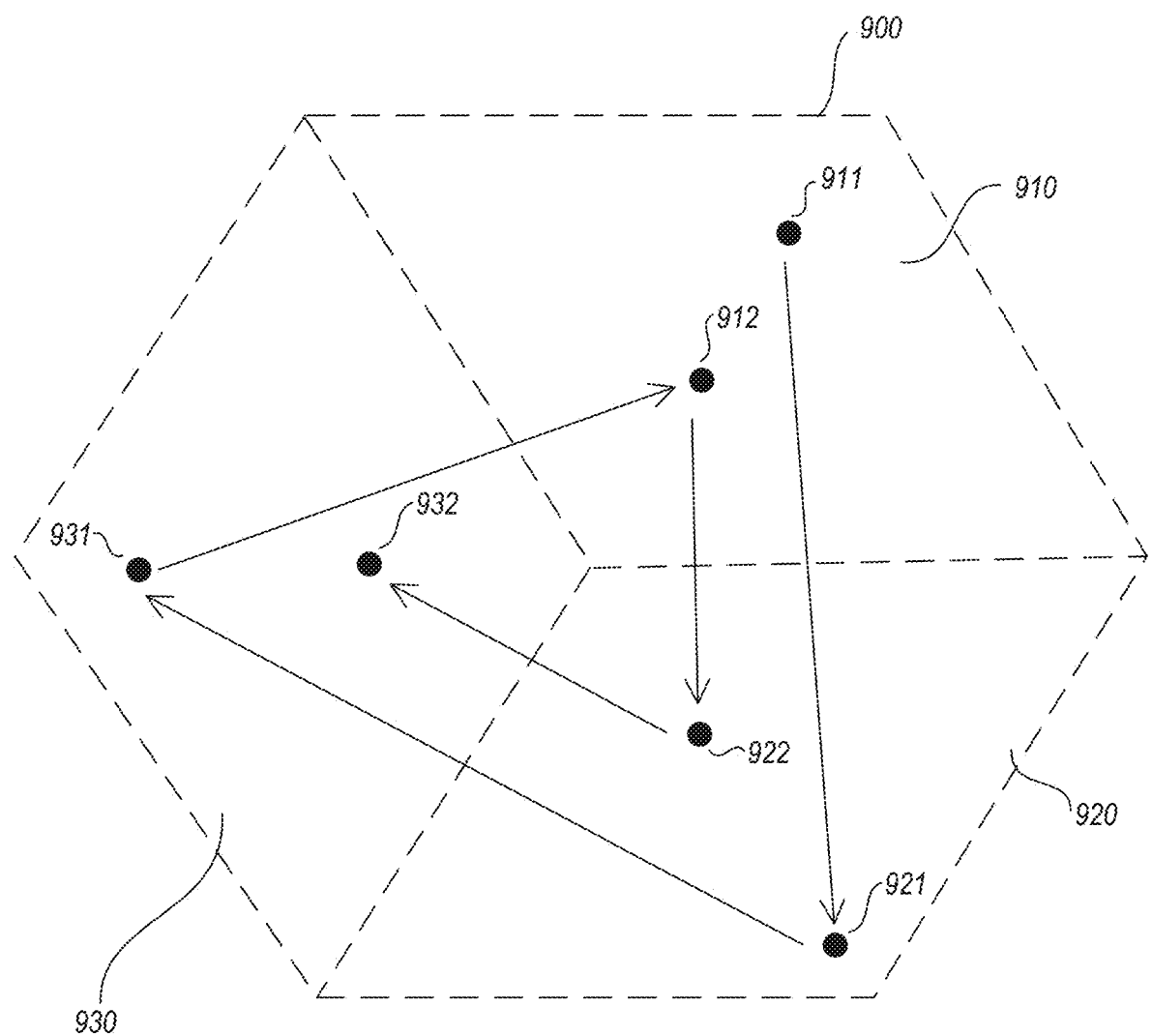
FIG. 9 is a map diagram showing a first drone route through a selected cell site to be tested.

FIGS. 8 and 9 show sample paths taken by the drone or other autonomous vehicle.

FIG. 8 is a map diagram showing a first drone route through a selected cell site to be tested. The cell site 800 is broken up into three sectors 810, 820, and 830. In the route, the drone first moves to location 811 in sector 810 to perform one or more tests; then moves to location 821 in sector 820 to perform one or more additional tests; then moves to location 831 in sector 830 to perform one or more additional tests.

FIG. 9 is a map diagram showing a first drone route through a selected cell site to be tested. The cell site 900 is broken up into three sectors 910, 920, and 930. In the route, the drone first moves to location 911 in sector 910 to perform one or more tests; then moves to location 921 in sector 920 to perform one or more additional tests; then moves to location 931 in sector 930 to perform one or more additional tests; then moves to location 912 in sector 910 to perform one or more tests; then moves to location 922 in sector in 920 to perform one or more additional tests; then moves to location 932 in sector 930 to perform one or more additional tests.

While many of the examples discussed above address testing with respect to a two-dimensional location that does not include height, in some embodiments, the facility performs testing with respect to three-dimensional locations that do include height. In some such embodiments, the technician inputs building floor numbers, or some other source of height information. In some embodiments, the testing app uses barometric pressure sensed by a pressure sensor in the testing phone to estimate height.

Figure 10:
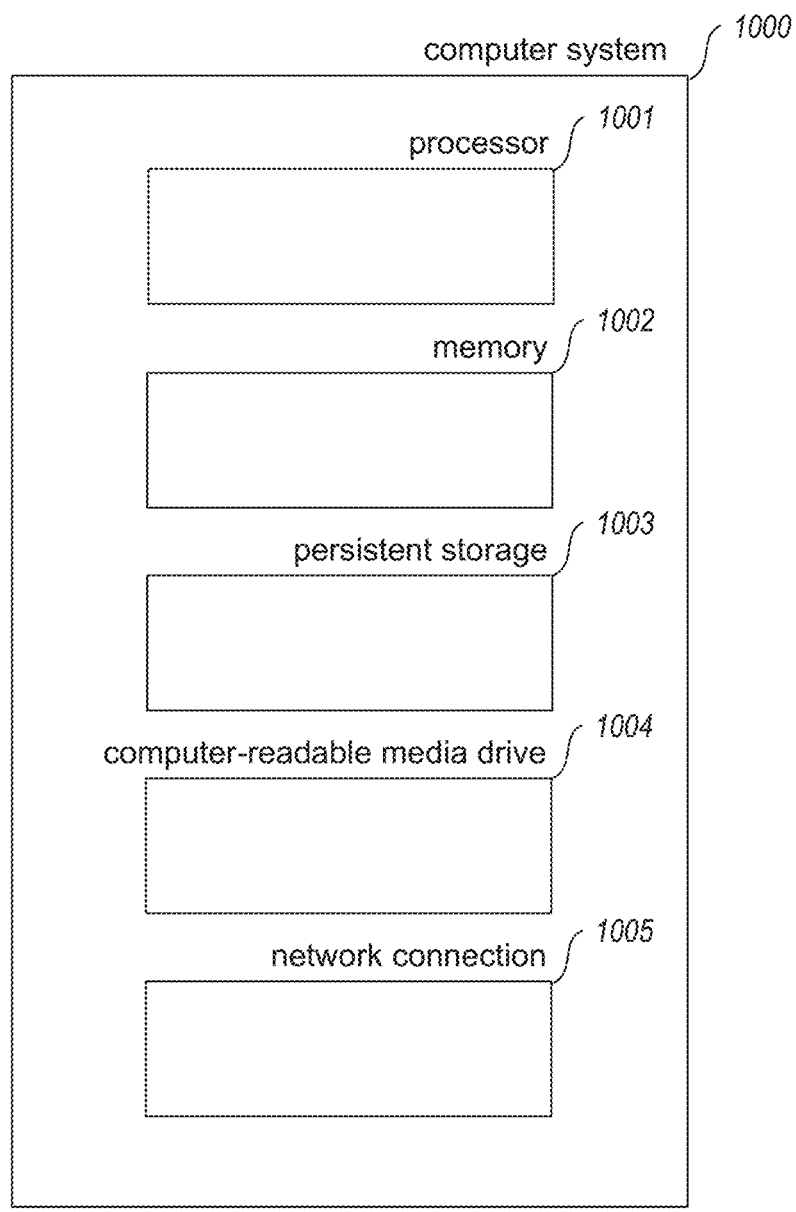
FIG. 10 is a block diagram showing some of the components typically incorporated in at least some of the computer systems and other devices on which the facility operates.

FIG. 10 is a block diagram showing some of the components typically incorporated in at least some of the computer systems and other devices on which the facility operates. In various embodiments, these computer systems and other devices 100 can include server computer systems, cloud computing platforms or virtual machines in other configurations, cloud computing, desktop computer systems, laptop computer systems, netbooks, mobile phones, personal digital assistants, televisions, cameras, automobile computers, electronic media players, etc. In various embodiments, the computer systems and devices include zero or more of each of the following: a processor 1001 for executing computer programs and/or training or applying machine learning models, such as a CPU, GPU, TPU, NNP, FPGA, or ASIC; a computer memory 1002 for storing programs and data while they are being used, including the facility and associated data, an operating system including a kernel, and device drivers; a persistent storage device 1003, such as a hard drive or flash drive for persistently storing programs and data; a computer-readable media drive 1004, such as a floppy, CD-ROM, or DVD drive, for reading programs and data stored on a computer-readable medium; and a network connection 1005 for connecting the computer system to other computer systems to send and/or receive data, such as via the Internet or another network and its networking hardware, such as switches, routers, repeaters, electrical cables and optical fibers, light emitters and receivers, radio transmitters and receivers, and the like. While computer systems configured as described above are typically used to support the operation of the facility, those skilled in the art will appreciate that the facility may be implemented using devices of various types and configurations, and having various components.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

The invention claimed is:

1. One or more instances of non-transitory computer-readable media collectively having contents configured to cause a computing system to perform a method, the method comprising:
   receiving an emergency telephone call placed by a mobile phone;
   extracting header information from the receiving emergency telephone call;
   determining, based on the extracted header information, whether the received emergency telephone call is a testing call;
   where it is determined that the received emergency telephone call is not a testing call, forwarding the received emergency telephone call to a first node for handling by a person; and
   where it is determined that the received emergency telephone call is a testing call, forwarding the received emergency telephone call to a second node for fully automatic handling.

2. The one or more instances of non-transitory computer-readable media of claim 1, the method further comprising: in the second node: receiving the forwarded emergency telephone call; extracting from header information of the call: calling phone identifying information, and location of the calling phone calculated using location information included in the call header information when placed; constructing a non-telephony message containing the extracted calculated location; and transmitting the constructed non-telephony message to the calling phone using the extracted calling phone identifying information.

3. The one or more instances of non-transitory computer-readable media of claim 1 wherein the extracted header information comprises a calling phone number, and wherein the determining determines whether the received emergency telephone call is a testing call based on whether the extracted calling phone number is among a set of testing phone numbers.

4. The one or more instances of non-transitory computer-readable media of claim 1 wherein the extracted header information comprises a special testing value, and wherein the determining determines whether the received emergency telephone call is a testing call based on the presence of the extracted special testing value.

5. The one or more instances of non-transitory computer-readable media of claim 1 wherein the extracted header information comprises a called phone number, and wherein the determining determines whether the received emergency telephone call is a testing call based on whether the extracted called phone number matches a testing emergency telephone call number or a non-testing emergency telephone call number.

6. A method comprising:
   receiving an emergency telephone call placed by a mobile phone;
   extracting header information from the receiving emergency telephone call;
   determining, based on the extracted header information, whether the received emergency telephone call is a testing call;
   where it is determined that the received emergency telephone call is not a testing call, forwarding the received emergency telephone call to a first node for handling by a person; and
   where it is determined that the received emergency telephone call is a testing call, forwarding the received emergency telephone call to a second node for fully automatic handling.

7. The method of claim 6, further comprising:
   in the second node:
      receiving the forwarded emergency telephone call;
      extracting from header information of the call:
         calling phone identifying information, and
         location of the calling phone calculated using location information included in the call header information when placed;
      constructing a non-telephony message containing the extracted calculated location; and
      transmitting the constructed non-telephony message to the calling phone using the extracted calling phone identifying information.

8. The method of claim 6, wherein the extracted header information comprises a calling phone number, and wherein the determining determines whether the received emergency telephone call is a testing call based on whether the extracted calling phone number is among a set of testing phone numbers.

9. The method of claim 6, wherein the extracted header information comprises a special testing value, and wherein the determining determines whether the received emergency telephone call is a testing call based on the presence of the extracted special testing value.

10. The method of claim 6, wherein the extracted header information comprises a called phone number, and wherein the determining determines whether the received emergency telephone call is a testing call based on whether the extracted called phone number matches a testing emergency telephone call number or a non-testing emergency telephone call number.

11. A system comprising:
   at least one processor; and
   at least one non-transitory computer-readable storage medium having computer-executable instructions stored thereon that, when executed by the at least one processor, cause operations to be performed, the operations including:
      receiving an emergency telephone call placed by a mobile phone;
      extracting header information from the receiving emergency telephone call;
      determining, based on the extracted header information, whether the received emergency telephone call is a testing call;
      where it is determined that the received emergency telephone call is not a testing call, forwarding the received emergency telephone call to a first node for handling by a person; and
      where it is determined that the received emergency telephone call is a testing call, forwarding the received emergency telephone call to a second node for fully automatic handling.

12. The system of claim 11, wherein the operations further include:
   in the second node:
      receiving the forwarded emergency telephone call;
      extracting from header information of the call:
         calling phone identifying information, and
         location of the calling phone calculated using location information included in the call header information when placed;
      constructing a non-telephony message containing the extracted calculated location; and
      transmitting the constructed non-telephony message to the calling phone using the extracted calling phone identifying information.

13. The system of claim 11, wherein the extracted header information comprises a calling phone number, and wherein the determining determines whether the received emergency telephone call is a testing call based on whether the extracted calling phone number is among a set of testing phone numbers.

14. The system of claim 11, wherein the extracted header information comprises a special testing value, and wherein the determining determines whether the received emergency telephone call is a testing call based on the presence of the extracted special testing value.

15. The system of claim 11, wherein the extracted header information comprises a called phone number, and wherein the determining determines whether the received emergency telephone call is a testing call based on whether the extracted called phone number matches a testing emergency telephone call number or a non-testing emergency telephone call number.

* * * * *